United States Patent [19]

Watanabe et al.

[11] Patent Number: 4,952,378
[45] Date of Patent: Aug. 28, 1990

[54] METHOD FOR NEUTRALIZATION TREATMENT OF SULFURIC ACID CONTAINING IRON IONS

[75] Inventors: Morio Watanabe, Hyogo; Renpei Sei, Kanagawa, both of Japan

[73] Assignee: Solex Research Corporation of Japan, Tokyo, Japan

[21] Appl. No.: 212,439

[22] Filed: Jun. 28, 1988

[30] Foreign Application Priority Data

Jun. 30, 1987 [JP] Japan ............................. 62-160849
Sep. 14, 1987 [JP] Japan ............................. 62-228539

[51] Int. Cl.$^5$ ..................... C01G 49/10; B01D 11/04
[52] U.S. Cl. .......................... 423/139; 423/DIG. 2; 423/DIG. 14
[58] Field of Search ............... 423/DIG. 2, 139, 390, 423/DIG. 14; 210/688, 754

[56] References Cited

U.S. PATENT DOCUMENTS

4,582,691  4/1986  Fujimoto et al. ............ 423/DIG. 14
4,696,801  9/1987  Devonald et al. ........... 423/DIG. 14

Primary Examiner—Jeffrey E. Russel
Assistant Examiner—Stephen G. Kalinchak
Attorney, Agent, or Firm—McAulay Fisher Nissen & Goldberg

[57] ABSTRACT

A method for neutralization of sulfuric acid containing Fe ions, comprising adding ions selected from the group consisting of Na ions, K ions, Mg ions, Ca ions and $NH_4$ ions in the form of a compound containing chlorine to a sulfuric acid solution to be treated in an amount corresponding at least to the chemical equivalent to $SO_4^{2-}$, and bringing the resultant solution into contact with an organic solvent containing oxygen or comprising alkylamine for extracting Fe ions from said aqueous solution into the organic phase as chloride complex. Iron chloride can be recovered from the organic phase by distilling or evaporating the organic solvent or by extracting back it into water.

10 Claims, 8 Drawing Sheets

METHOD FOR NEUTRALIZATION TREATMENT OF SULFURIC ACID CONTAINING IRON IONS

BACKGROUND OF THE INVENTION

1. Field of the Invention:

The present invention relates to a method for neutralization of sulfuric acid containing iron ions as main impurity.

2. Description of the Related Art:

As a method for neutralization of sulfuric acids containing iron ions as main impurity, such as waste sulfuric acids in surface treatments of steel products, in refining processes of non-ferrous metals and in production processes of titanium oxides using sulfuric acid as well as sulfuric acid obtained by distilling or evaporating hydrochloric acid or nitric acid containing iron ions to which sulfuric acid has been added, addition of sodium hydroxide for the neutralization has commonly been adopted. However, such a method is uneconomical because sodium hydroxide is precious and sodium sulfate obtained as by-product is of almost no commercial value.

Use of ammonia gas or ammonium hydroxide has also been conventionally applied in some instances, but commercialization of ammonium sulfate as a by-product is difficult and ammonium sulfate itself is cheap, and therefore, such a method is also not economical. It is possible to use $Ca(OH)_2$ or $CaCO_3$, which are cheaper than NaOH and $NH_4OH$, but disposal of the solid by-product, $CaSO_4.2H_2O$ (gypsum), is troublesome, so that the use of such a calcium compound is also not desirable.

Accordingly, it is the present status that the factories, in which waste sulfuric acid containing iron ions is formed as by-product, are trying to find a new market of $Na_2SO_4$ or to develop an effective use of gypsum ($CaSO_4.2H_2O$) However, an effective and economical method for neutralization of waste sulfuric acid containing iron ions has not yet been discovered.

In addition to the neutralization process, there is another way for the recovery and reuse of sulfuric acid solution containing Fe ions, in which the solution is subjected to evaporation under reduced pressure for precipitating $FeSO_4.7H_2O$ so as to reduce the content of Fe ion in the residual solution. This method is adopted widely, but since it is impossible to obtain pure sulfuric acid containing entirely no Fe ion and a large quantity of energy is consumed thereby for the evaporation and concentration, this method is neither practical nor economical.

SUMMARY OF THE INVENTION

Under such circumstances, the object of the present invention is to offer an excellent and economical method for neutralization of sulfuric acids containing iron ions as main impurity, in which iron can be recovered as high purity iron oxide and/or metallic iron, thus enhancing its commercial value, with no need of using precious NaOH, $NH_3$ and $NH_4OH$ or a calcium compound such as $Ca(OH)_2$ and $CaCO_3$, which produce troublesome gypsum (($CaSO_4)_2.2H_2O$), but using a metal compound containing chlorine, for instance, cheap and easily available NaCl, $MgCl_2$ produced largely as industrial waste, $CaCl_2$ and $NH_4Cl$.

The method can also be applicable for treatment of waste hydrochloric acid and nitric acid containing Fe ions, in which sulfuric acid is added thereto and the resultant solution is evaporated or distilled for recovering HCl or $HNO_3$ and transforming the residual solution to sulfuric acid, and the sulfuric acid thus obtained is treated similarly as in the above.

The principle of the present invention is to add a metal compound containing chlorine, such as NaCl, to sulfuric acid solutions containing Fe ions and to extract iron chloride therefrom into an organic solvent containing oxygen and/or comprising alkylamine as a chloride complex.

In the present invention, ions selected from the group consisting of Na ions, K ions, Mg ions, Ca ions and $NH_4$ ions in the form of a compound containing chlorine are added to a sulfuric acid solution containing iron ions in an amount corresponding at least to the chemical equivalent to $SO_4^{2-}$ contained, and the resultant aqueous solution is brought into contact with at least one of the organic solvents containing oxygen or comprising alkylamine to extract Fe ions from said sulfuric acid solution into the organic phase as a chloride complex. The organic solvent containing Fe as chloride complex thus obtained is then brought into contact with water to extract back iron and chlorine therefrom into the aqueous phase and regenerate the organic solvent.

Further, for increasing the inverse extraction effect, it is preferable that another organic solvent containing oxygen, for instance, an alcohol with a carbon number of 6-18 (primary, secondary and tertiary) is added to the organic phase before the organic phase is brought into contact with water, and then the resultant organic solution is brought into contact with water to inversely extract Fe ions and Cl ions into the aqueous phase, and the remaining organic solution is distilled or evaporated under reduced or ordinary atmospheric pressures to separate and regenerate the organic solvent added prior to the inverse extraction as the original state.

As a modified process, the organic solvent containing iron chloride complex may be distilled or evaporated under reduced or ordinary atmospheric pressures prior to the contact with water for separating and recovering water and hydrochloric acid from the organic solution, and then the remaining organic solution is brought into contact with water to inversely extract Fe ions and Cl ions into the aqueous solution and regenerate the organic solvent.

In the present invention, separately, after adding sulfuric acid to a hydrochloric acid solution containing chiefly Fe ions, ions selected from the group consisting of Na ions, K ions. Mg ions, Ca ions and $NH_4$ ions in the form of a compound containing chlorine are added in an amount corresponding at least to the chemical equivalent to $SO_4^{2-}$, and the resultant aqueous solution can be treated with addition of at least one of oxygen-containing organic solvents or alkylamine organic solvents similarly as described in the above. A hydrochloric acid or nitric acid containing Fe ions to which sulfuric acid is added may also be distilled or evaporated under reduced or ordinary atmospheric pressures to separate and recover HCl or $HNO_3$, and the remaining aqueous solution can also be treated similarly as in the above.

Whereas no satisfactory and economical method for the neutralization of sulfuric acid containing Fe ions has been discovered in the past, the present invention is to offer an excellent and economical method for the neutralization treatment thereof, in which further refined iron hydroxide, oxide and metallic iron can be recovered.

Particularly, in applying rock salt as a typical sodium chloride as the additive for the chloridizing process (B) as will be described hereinafter, rock salt is distributed widely on earth, not only easily obtainable and cheap, but also the aqueous solution as the residual solution (D) in the extraction process (C) comprises $Na_2SO_4$ in this instance, so that purified Glauber salt ($Na_2SO_4.10H_2O$) can easily be recovered therefrom with no need of evaporation and concentration. Therefore, the pollution of rivers due to the waste solution can sufficiently be prevented in the present invention.

DETAILED DESCRIPTION OF THE INVENTION

To a sulfuric acid solution containing chiefly Fe ions with other metal ions such as Al, Mn, Cr, V, Sn and Nb and so on, which has been used for surface treatment of a metal product or a metal material, or particularly discharged in the production of titanium oxide by the sulfuric acid process, ions selected from the group consisting of Na ions, K ions, Mg ions, Ca ions and $NH_4$ ions in the form of a compound containing chlorine are added in an amount corresponding at least to the chemical equivalent to $SO_4{}^{2-}$. In the case where iron in the sulfuric acid solution is in the state of $Fe^{2+}$ ions, such ions are oxidized previously to $Fe^{3+}$. The resultant aqueous phase is brought into contact with an organic solvent containing oxygen and/or alkylamine. Then $Fe^{3+}$ ions in the sulfuric acid solution are extracted into the organic solvent as chloride complex, and thus the sulfuric acid can be neutralized, for instance, according to the following equations:

$Fe_2(SO_4)_3 + H_2SO_4 + 8NaCl + Org. \rightarrow 2HFeCl_4.Org. + 4Na_2SO_4$ $FeSO_4 + H_2SO_4 + 4NaClO + 7H^+ + Org. \rightarrow HFeCl_4.Org. + 2Na_2SO_4 + 4H_2O$ $Fe_2(SO_4)_3 + H_2SO_4 + 8KCl + Org. \rightarrow 2HFeCl_4.Org. + 4K_2SO_4$ $Fe_2(SO_4)_3 + H_2SO_4 + 4CaCl_2 + Org. \rightarrow 2HFeCl_4.Org. + 4CaSO_4$ $FeSO_4 + H_2SO_4 + CaCl_2.Ca(ClO)_2.2H_2O + 3H^+ + Org. \rightarrow HFeCl_4.Org. + 2[CaSO_4.2H_2O]$ $Fe_2(SO_4)_3 + H_2SO_4 + 4MgCl_2 + Org. \rightarrow 2HFeCl_4.Org. + 4MgSO_4$ $Fe_2(SO_4)_3 + H_2SO_4 + 8NH_4Cl + Org. \rightarrow 2HFeCl_4.Org. + 4(NH_4)_2SO_4$ Further, when the content of Fe ions in the original sulfuric acid solution is small as compared with the content of $SO_4$ ions, it is necessary to add Fe ions thereto for neutralizing $H_2SO_4$ sufficiently with the use of a compound comprising such a component as Na, K or $NH_4$ together with Cl. As a method for controlling the iron concentration, for instance, in the case of waste sulfuric acid in the production of titanium oxide, such a material as ilmenite, anatase or high titanium slag as it stands or after the reduction treatment or iron containing industrial waste (in the case when its treatment is difficult) is added to the waste sulfuric acid for dissolving Fe ions therein selectively so as to control the ratio of Fe to sulfuric acid in the solution. By dissolving iron in the raw material with the use of waste acid in this way, $TiO_2$ concentration in ilmenite, anatase or high titanium slag is increased, and thus it is expected that the additional value thereof as a raw material can simultaneously be enhanced.

On the other hand, by bringing the organic solvent containing iron chloride complex into contact with water, Fe ions and Cl ions are inversely extracted into the aqueous solution as it is well known, and the organic solvent is regenerated according to the well known equation as shown below:

$HFeCl_4.Org. + H_2O \rightarrow Org. + (FeCl_3 + HCl + H_2O)$ (aq. phase)     (aq. phase)

Further, before bringing the organic solvent containing iron chloride complex extracted into contact with water, an oxygen-containing organic solvent with which a large quantity of water can be extracted, such as an alcohol with a carbon number of 6–18 (primary, secondary and tertiary) is added for increasing the inverse extraction efficiency, and then the resultant organic solution is brought into contact with water for inversely extracting Fe ions and Cl ions in the organic solution into the aqueous solution, and the remaining organic solution is distilled or evaporated under reduced or ordinary atmospheric pressures for separating the oxygen-containing organic solvent added to the organic solution prior to the inverse extraction, for instance, alcohol, and regenerating the original organic solvent to the original state.

Further, the organic phase containing iron chloride complex is subjected to distillation or evaporation under reduced or ordinary atmospheric pressures for recovering HCl and $H_2O$ according to the following equation:

$HFeCl_4.Org. + H_2O.Org. \xrightarrow{\text{distillation or evaporation}}$ $FeCl_3.Org. + Org. + (HCl + H_2O) \uparrow$ The remaining organic phase is subjected to inverse extraction in contact with water as follows:

$FeCl_3.Org. + H_2O \rightarrow Org. + (FeCl_3 + H_2O)$ (aq. phase)

In this instance, since the back-extracted aqueous phase contains no HCl, a concentrated $FeCl_3$ solution can be obtained, and accordingly the production of iron hydroxide and oxide from $FeCl_3$ transferred to the aqueous phase can be done economically.

On the other hand, the distillation of the organic phase containing iron chloride complex may further be continued under reduced pressure for distilling and recovering the organic solvent, leaving $FeCl_3$ as anhydrous solid as shown below:

$FeCl_3.Org. \xrightarrow{\text{evaporation}} FeCl_3 + Org. \uparrow$

The recovered organic solvent can be used circulatorily for the extraction of iron chloride complex Further. in this instance, since FeCl$_3$ has no crystal water, its recovery as iron oxide or metallic iron can easily be done as follows:

$$FeCl_3 + \tfrac{3}{4}O_2 \rightarrow \tfrac{1}{2}Fe_2O_3 + 1.5Cl_2 \uparrow$$

$$FeCl_3 + 1.5H_2O \rightarrow \tfrac{1}{2}Fe_2O_3 + 3HCl \uparrow$$

$$FeCl_3 + 1.5H_2 \rightarrow Fe + 3HCl \uparrow$$

The thus recovered FeCl$_3$ may also be applied for the production of various alkoxides as in the following equation:

$$FeCl_3 + 3ROH + 3NH_3 \rightarrow Fe(OR)_3 + 3NH_4Cl$$

where ROH shows an alcohol.

The recovery of iron as an optional process in the present invention can be done in this way in various different ways. In considering the practical situation, the production of iron hydroxide, iron oxide, iron chloride (solid), iron alkoxide and metallic iron can freely be selected.

Now, as a compound containing Na and Cl used in the present invention, the typical one is NaCl chiefly comprising rock salt, and such compounds as NaClO and NaClO$_3$ may also be used. As a compound containing Ca and Cl, the typical one is CaCl$_2$ exhausted in a large quantity as industrial waste, and such compounds as CaCl$_2$·Ca(ClO)$_2$ may also be used. Further, NH$_4$Cl and MgCl$_2$ may also be used.

For the oxidation of Fe$^{2+}$ ions in the sulfuric acid solution into Fe$^{3+}$ ions, a compound such as sodium hypochlorite (NaClO) or calcium chloride-hypochlorite (CaCl$_2$·Ca(ClO)$_2$) are used. Further, NO$_x$-type oxidizing agents such as HNO$_3$, NaNO$_3$, NH$_4$NO$_3$ and NO$_x$ gas may also be employed.

When Fe$^{2+}$ ions are oxidized to Fe$^{3+}$ ions with HNO$_3$, HNO$_3$ is extracted into the organic phase together with the iron chloride complex (HNO$_3$ + Org. → HNO$_3$·Org.) and this co-extracted HNO$_3$ is brought into contact with an aqueous solution containing NaCl prior to the back-extraction of Fe ions and Cl ions to back-extract HNO$_3$ into the aqueous solution, leaving Fe ions and Cl ions in the organic solvent. (HNO$_3$·Org. + NaCl → Org. + NaNO$_3$ + HCl)

HCl remaining in the aqueous solution contributes to improve the extraction distribution ratio of the iron chloride complex so that Fe ions and Cl ions co-present with HNO$_3$ remain in the organic phase. Meanwhile the back-extracted HNO$_3$ is reused for the oxidation of Fe$^{2+}$ ions.

Organic solvent containing oxygen and/or comprising alkylamine used in the present invention is selected from the following groups:

(a) The group of ethers:

Ethers to be used as an organic solvent containing oxygen in the present invention are selected from the group consisting of saturated and unsaturated aliphatic and aromatic ethers, for instance, diisoamyl ether, diethyl ether, diisopropyl ether, dichlorodiethyl ether and so on.

(b) The group of ketones:

(where R and R' are an alkyl or aryl radical with a carbon number of 2–18) including methyl isobutyl ketone, methyl propyl ketone, methyl amyl ketone, cyclohexanon, methyl cyclohexanon and so on.

(c) The group of esters:

The group of phosphoric acid esters selected from the group consisting of following types:

(where R is an alkyl radical with a carbon number of 4–18).

(d) The group of amides:

(where R, R' and R" are alkyl radical with a carbon number of 2–18)

(e) The group of alcohols:

Various primary, secondary and tertiary alcohols with a carbon number of 4 to 18.

(f) The group of alkylamines:

Various primary, secondary and tertiary alkylamines with a carbon number in alkyl group of 4 to 24.

When an organic solvent having a high degree of basicity, such as alkylphosphineoxide is used, the amount of Cl ions extracted together with Fe ions is very often three times Fe ions in the molar ratio according to the following reaction:

Therefore, when such high basic extractants are used, it is necessary to add Fe-containing solid or liquid so as to assure that the molar ratio of Fe ions to the sum of SO$_4$ combined with Fe and free SO$_4$ approaches the maximum ratio (about 0.66). Needless to say, at plants where titanium oxides are produced it is possible to adjust the molar ratio of Fe ions by adding titanium materials, such as, anatase and ilmenite, iron sulfate or wastes containing Fe and Ti.

In the present invention, the organic solvent used for the extraction of iron chloride is occasionally diluted with a petroleum hydrocarbon comprising aliphatic and aromatic hydrocarbons or a mixture thereof. A mixture of various hydrocarbons, such as, kerosine, is also used frequently.

DESCRIPTION OF THE PREFERRED EMBODIMENTS

The preferred embodiments of the present invention will be described in details with reference to the drawings showing the examples of the inventive process, but the scope of the present invention is not limited merely thereto.

Figure 1:
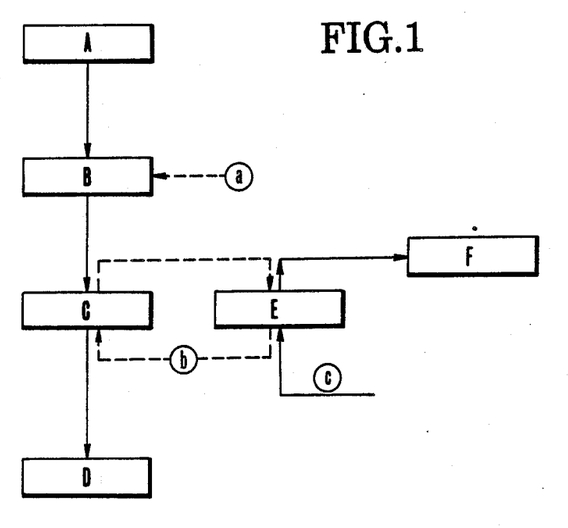
FIG. 1 is a flow sheet showing a basic-type process of the present invention.

The flow sheet in FIG. 1 is to show the basic type of the present method, in which a sulfuric acid solution containing Fe ions (A) is introduced in a chloridizing process (B), where such a compound as comprising Na and Cl, Ca and Cl, K and Cl, Mg and Cl or $NH_4$ and Cl (a) is added thereto for converting Fe ions into chloride, and the resultant solution is introduced into an extraction process (C), where the aqueous phase is brought into contact with at least one organic solvent (b) containing oxygen and/or comprising alkylamine for extracting Fe ions from the aqueous phase into the organic phase as chloride complex and leaving a residual aqueous solution (D) in which sulfuric acid is neutralized.

On the other hand, iron chloride complex transferred into the organic phase is brought into contact with water (c) in a inversely extracting process (E) for inversely extracting Fe ions and Cl ions in the organic phase into an aqueous solution (F) and regenerating the organic solvent (b) containing oxygen and/or comprising alkylamine.

The back extracted aqueous phase comprises iron chloride solution (F) with no contamination by impurities such as sulfate, so that iron hydroxide can easily be obtained therefrom by the double decomposition with the use of cheap $Ca(OH)_2$ leaving $CaCl_2$ solution with no formation of precipitates such as gypsum, and iron oxide and metallic iron can easily be obtained therefrom for such uses as electronic material and pigment.

Figure 2:
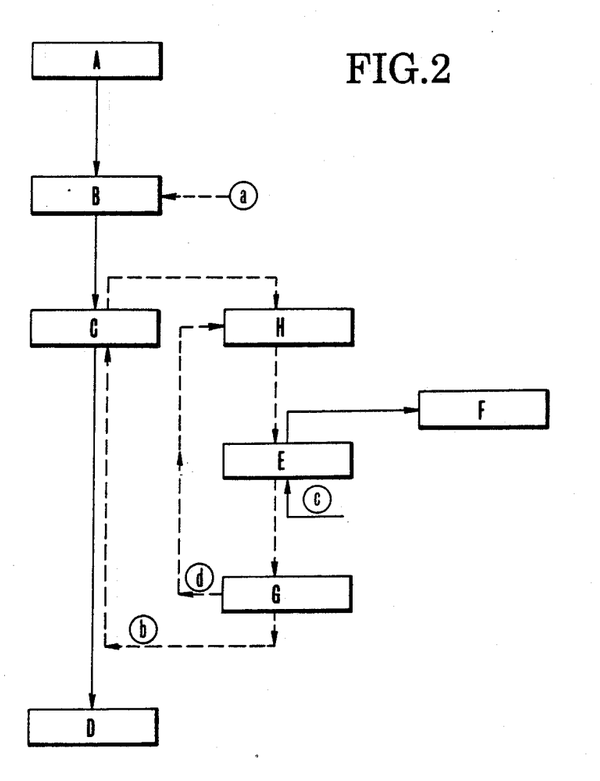
FIGS. 2, 3 and 4 are, respectively, a flow sheet showing a basic-type process for inversely extracting iron chloride from the organic solvent containing iron chloride complex extracted therein.

The flow sheet in FIG. 2 is basically same as in FIG. 1, but for the purpose to carry out the extraction of iron in the extraction process (C) more completely, another oxygen-containing organic solvent (d) whose boiling point being lower than that of the former oxygen-containing organic solvent (b) is added in a mixing process (H), and then the resultant organic phase is brought into contact with water in the inversely extracting process (E) for inversely extracting Fe ions together with Cl ions in the organic phase into the aqueous phase. After inverse extraction, the organic phase is transferred into the next evaporation or distillation process (G) for separating the low boiling point organic solvent (d) added prior to the inverse extraction and regenerating the original organic solvent (b).

Figure 3:
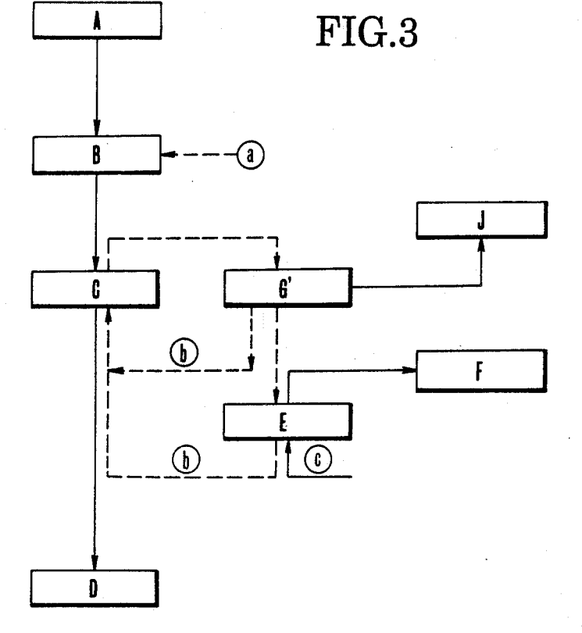

The flow sheet in FIG. 3 is same as in FIGS. 1 and 2 in the point that sulfuric acid containing Fe is subjected to neutralization treatment in the first place, but the method for inversely extracting the oxygen-containing organic solvent (b) containing iron chloride complex extracted differs therefrom. Namely, the organic solvent containing iron chloride complex is introduced into a next distillation or evaporation process (G') for separating and recovering HCl (J) together with water contained physically and extracted. A part of the organic solvent is also separated thereby. $FeCl_3$ is concentrated in the organic solvent (b), and the organic solution is contacted with water (c) in an inversely extracting process (E) for inversely extracting Fe ions and Cl ions into the aqueous solution. The merit of this process is to improve the effect of inverse extraction due to the effect of separating HCl together with water prior to the inverse extraction for controlling the formation of iron chloride complex.

Figure 4:
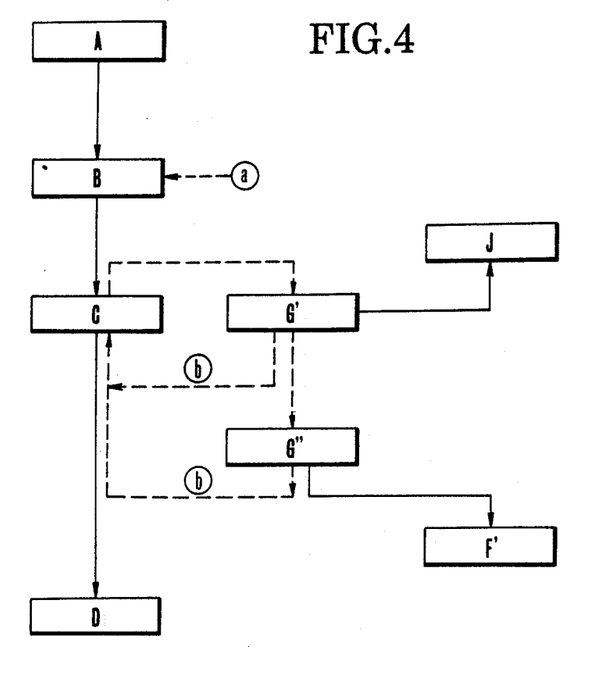

The flow sheet in FIG. 4 is basically same as the flow sheet in FIG. 3, but the organic solvent containing iron chloride complex, from which HCl and water (J) are removed in a primary distillation or evaporation process (G'), is distilled continuously under reduced pressure or newly distilled or evaporated in a secondary distillation or evaporation process (G") so as to separate and regenerate the organic solvent (b) and to recover anhydrous iron chloride (F') from the residue. Anhydrous iron chloride (F') obtained thereby may be converted into iron oxide or metallic iron by means of a known method. Since iron chloride obtained is in an anhydrous state, its treatment is easy. Anhydrous iron chloride may also be converted into alkoxide by the treatment with addition of alcohol and ammonia gas for production of electronic material.

Figure 5:
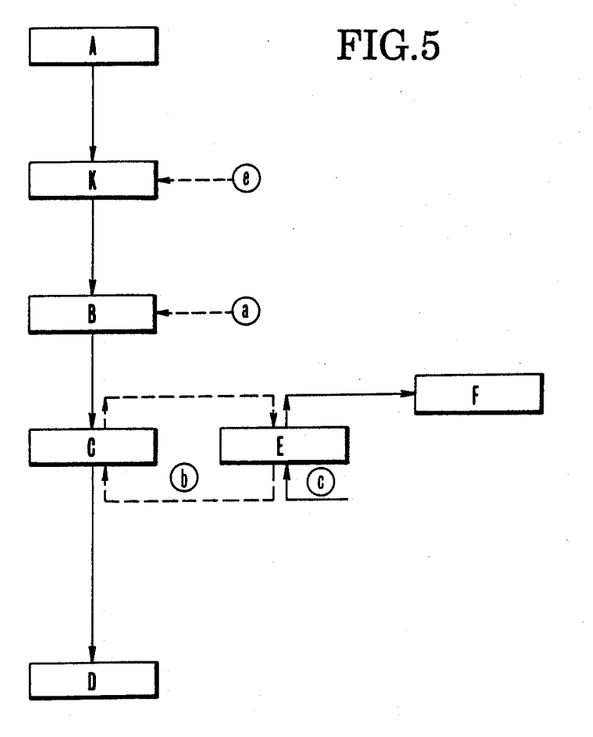
FIG. 5 is a flow sheet in which the oxidation process of $Fe^{2+}$ ion (K) is inserted in the basic-type process shown in FIG. 1.

The flow sheet in FIG. 5 is same as in FIG. 1 except that, as a countermeasure when iron in the original waste sulfuric acid solution is in the state of $Fe^{2+}$, the oxidation process of iron (K) is added. The process depends either on the addition of an oxidation agent (e) or the electrochemical oxidation. The treatments thereafter are the same as in FIG. 1.

Figure 6:
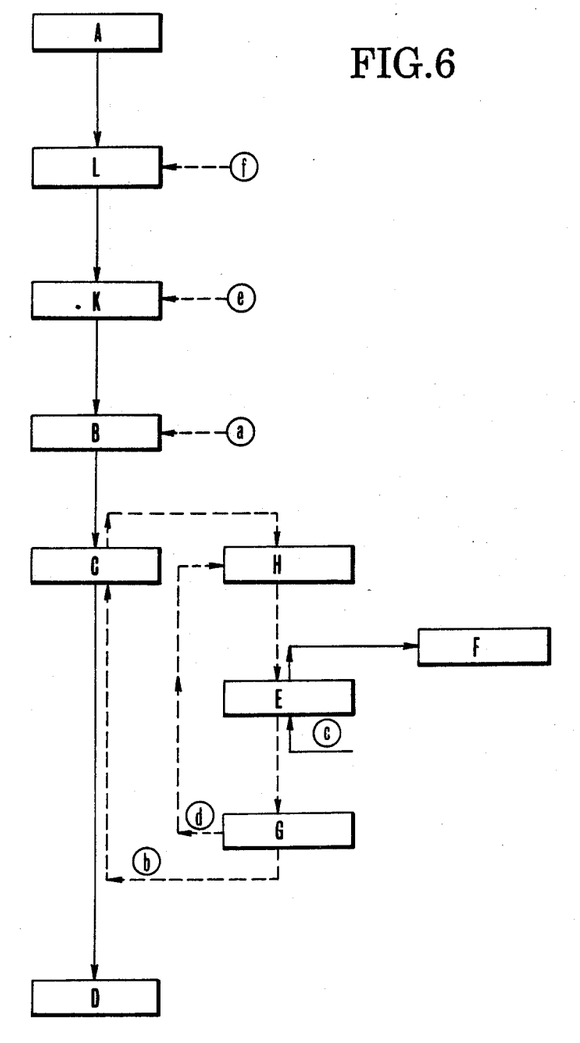
FIG. 6 is to show a process of controlling Fe ion concentration (L) in the waste sulfuric acid solution, in which the treatments as shown in FIGS. 1, 3 and 4 may be applied in the process of extracting iron chloride complex (L) and thereafter.

The flow sheet in FIG. 6 is similar to the flow sheet in FIG. 2, but, as a countermeasure when the content of Fe ion in the waste sulfuric acid solution to be treated is not appropriate (one mol of Fe is necessary for 2 mols of $H_2SO_4$). the sulfuric acid solution is introduced in an iron concentration control process (L), and an additive (f), which is a material containing a relatively large amount of iron such as iron sulfate, an industrial waste containing iron, ilmenite and anatase when the iron concentration is low and waste sulfuric acid or waste hydrochloric acid whose iron content is a small when the iron concentration is relatively high, is added thereto for controlling the ratio of Fe ion and $H_2SO_4$ appropriately.

In the following oxidation process (K), $Fe^{2+}$ ions in the solution are transformed into $Fe^{3+}$ ions with the addition of an oxidizing agent (e). The treatments thereafter shown in FIG. 6 are same as in FIG. 2, but for the processes of inverse extraction and thereafter, various processes as shown in FIG. 1, 3 and 4 may also be applied.

Figure 7:
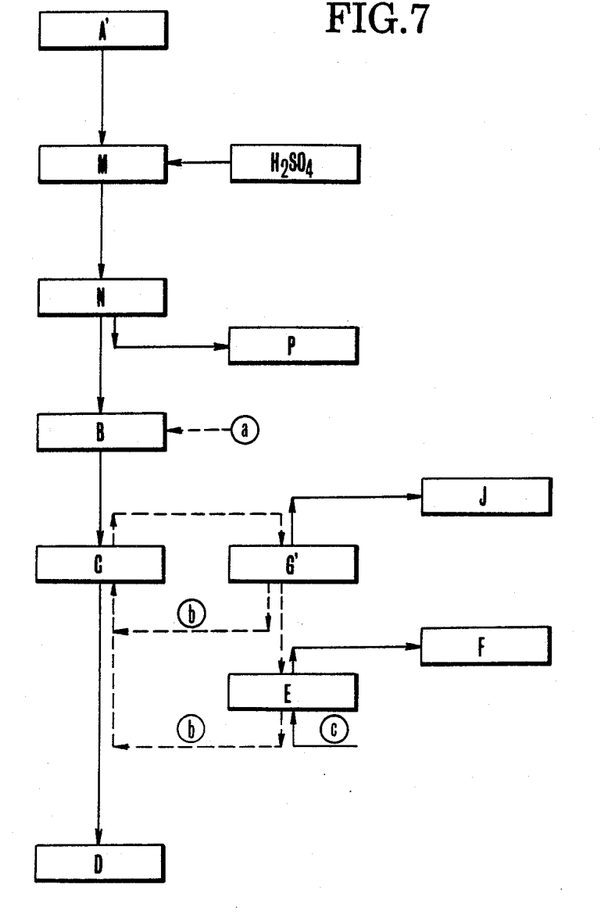
FIG. 7 is a flow sheet in which a process of transforming hydrochloric acid or nitric acid solution into sulfuric acid solution (M) is included.

The flow sheet shown in FIG. 7 relates to a process for the treatment of hydrochloric acid or nitric acid containing iron ions (A') as main impurity. Sulfuric acid is added to the acid solution (A') in a transformation process (M), and HCl or $HNO_3$ (P) is separated and recovered due to difference in the vapor pressure in a distillating or evaporating process (N). The resultant sulfuric acid solution containing chiefly iron ions is transferred to a chlorination process (B), where a compound comprising Na, Ca, K, Mg or NH₄ together with Cl (a) is added thereto for converting Fe ions into iron chloride, and the resultant solution is introduced into an extraction process (C). The processes thereafter shown in FIG. 7 is same as in the case of FIG. 4, but various processes as shown in FIGS. 1, 2 and 3 may also be applied therefor.

Figure 8:
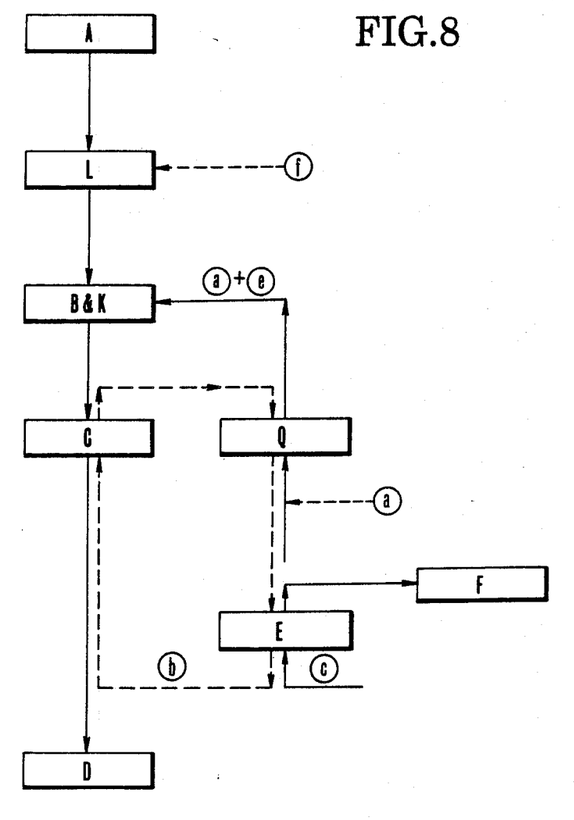
FIG. 8 is a flow sheet same as in FIG. 6, in which, however, $HNO_3$ is used as an oxidation agent (e) for oxidizing $Fe^{2+}$ ion after the Fe ion concentration is controlled in the Fe concentration control process (L).

FIG. 8 is a flow sheet similarly as in FIG. 1, in which, however, $HNO_3$ is used as an oxidizing agent (e) for oxidizing $Fe^{2+}$ ions after the Fe ion concentration is controlled in a Fe concentration control process (L). The remaining $HNO_3$ is extracted simultaneously with iron chloride complex into the organic phase in the extraction process (C). Then, the organic solvent (b) containing iron chloride complex and $HNO_3$ is introduced into a $HNO_3$ recovering process (Q), where said organic phase is brought into contact with an aqueous solution containing chloridizing agent (a) (a compound of Na, NH₄ or Mg together with Cl) containing $FeCl_3$ for transferring only $HNO_3$ in the organic solution into the aqueous phase, leaving Fe ions and Cl ions in the organic solution (b). Fe ions and Cl ions are then extracted into the aqueous phase in a following inversely extracting process (E). $HNO_3$ transferred into the aqueous phase comprises a solution containing the chloridizing agent (a), and is introduced in an oxidizing and chloridizing process (B or K), the chloridizing agent (a) and the oxidizing agent (e) are used repeatedly. As the further processes, the methods shown in FIGS. 3, 4 and 7 may be used in combination.

EXAMPLES

The present invention will be explained more in detail in the following with reference to the examples.

EXAMPLE 1

As a typical waste sulfuric acid solution containing Fe ions, waste sulfuric acid discharged during the production of titanium oxide by a sulfuric acid method was adopted. Its composition is shown in Table 1 below.

TABLE 1

| Total $H_2SO_4$ | $Fe^{2+}$ | $Fe^{3+}$ | Al | Mn | Ti | V | Cr | Nb |
|---|---|---|---|---|---|---|---|---|
| | | | | (g/l) | | | | |
| 380 | 33.5 | Trace | Trace | 7.8 | 2.8 | 0.1 | 0.1 | 0.01 |

By adding $HNO_3$ with a concentration of 10% to the waste sulfuric acid solution so as to assure the concentration of $HNO_3$ in the solution is 30%, and the resultant solution was heated to 60° C. to convert all the $Fe^{2+}$ ions contained completely to $Fe^{3+}$ ions. Then, NaCl solution was added in an amount necessary to convert total $H_2SO_4$ sufficiently to $Na_2SO_4$. The composition of the resultant solution is shown in Table 2.

TABLE 2

| $Fe^{3+}$ | $Fe^{2+}$ | Total $H_2SO_4$ | Total HCl | Total Na | Total $HNO_3$ | Al, Mn, Ti, V, Cr, Nb |
|---|---|---|---|---|---|---|
| | | | (g/l) | | | |
| 22.1 | <0.1 | 248 | 175 | 115 | 15.1 | Minute Quantities |

The extraction test of the solution was carried out by using (a) 50% tributyl phosphate (TBP)+50% isoparaffine, and (b) 20% trioctyl amine (TOA)+10% TBP+70% isoparaffine. The extracting condition was as follows: the ratio of organic solvent to sulfuric acid solution (O/A ratio)=1.2/1, extraction time: 20 minutes, and temperature: room temperature. The analysis of the residual aqueous solution is shown in Table 3.

TABLE 3

| Solvent | $Fe^{3+}$ | $Fe^{2+}$ | Total $H_2SO_4$ | Total HCl | Total Na | Total $HNO_3$ | Al, Mn, Ti, V, Cr, Nb |
|---|---|---|---|---|---|---|---|
| | | | | (g/l) | | | |
| (a) | 0.04 | <0.001 | 248 | 120 | 115 | 15.1 | No Change |
| (b) | <0.001 | 0.08 | 246 | 110 | 115 | 15.1 | No Change |

These two solutions were subjected respectively to heating under a reduced pressure (−600 mm Hg) for removing HCl and $HNO_3$, and as a result, it was confirmed that both the amounts of HCl and $HNO_3$ were reduced to less than 10 g/l, and all the sulfuric acid was neutralized to $Na_2SO_4$ due to the effect of Na ion added.

EXAMPLE 2

To 1 liter of sulfuric acid solution shown in Table 1, rock salt was added in an amount corresponding to the chemical equivalent to $SO_4$ contained (430 g). At 70° C., ilmenite with the composition as shown in Table 4 and a particle size of less than −100 mesh and 2 mol/l $HNO_3$ were added alternately thereto, and the addition of $HNO_3$ was stopped when the concentration of $HNO_3$ in the solution became about 50%. The addition of ilmenite was continued until the ratio of Fe and sulfuric acid in the solution became 0.95 mol:2 mol.

TABLE 4

| Total $TiO_2$ | FeO | $Fe_2O_3$ | $Al_2O_3$ | MnO | $Cr_2O_3$ |
|---|---|---|---|---|---|
| | | (wt. %) | | | |
| 52.18 | 27.86 | 10.18 | 0.33 | 5.96 | 0.015 |

The composition of the solution after the treatment is shown in Table 5.

TABLE 5

| Total $H_2SO_4$ | Total HCl | Total $HNO_3$ | Total Na | $Fe^{3+}$ | Al | Mn | $Ti^{4+}$ | Cr | V | Nb |
|---|---|---|---|---|---|---|---|---|---|---|
| | | | | (g/l) | | | | | | |
| 260 | 182 | 48.3 | 116 | 70.5 | 0.06 | 7.1 | 4.1 | 0.06 | 0.06 | — |

The thus controlled solution was brought into contact three times with an organic solvent comprising 30% trioctylphosphine oxide (TOPO)+70% kerosine for extracting Fe ions in the aqueous solution into the organic solvent as iron chloride complex. The extracting condition in every time was O/A (Org./Aq.)=5.0/1.0 with the contact time of 5 minutes at 32° C. The composition of the residual aqueous solution is shown in Table 6.

TABLE 6

| | (g/l) | | | | |
|---|---|---|---|---|---|
| Total $H_2SO_4$ | Total HCl | Total $HNO_3$ | Total Na | Total Fe | Al, Mn, Ti, Cr, V, Nb |
| 269 | 5.1 | 0.2 | 119 | 0.06 | No Change |

It was proved that the residual solution was completely neutralized, and $Na_2SO_4 \cdot 10H_2O$ was precipitated in cooling.

EXAMPLE 3

Inverse extraction test of iron chloride complex extracted in the oxygen-containing organic solvent into aqueous solution was done with the use of water.

At first, the aqueous solution in Table 5 was brought into contact with an organic solvent comprising 35% trioctyl phosphine oxide (TOPO)+5% 2-ethylhexyl alcohol+60% n-paraffine countercurrently in 6 stages. The extraction condition was O/A=2.0/1.0 with a contact time of 5 minutes at 32° C. The residual aqueous solution is shown in Table 7, and the organic solution obtained is shown in Table 8.

TABLE 7

| | (g/l) | | | | |
|---|---|---|---|---|---|
| Total $H_2SO_4$ | Total HCl | Total $HNO_3$ | Total Na | Total Fe | Al, Mn, Ti, Cr, V, Nb |
| 261 | 5.2 | 0.1 | 116 | <0.01 | No Change |

TABLE 8

| | (g/l) | | | | |
|---|---|---|---|---|---|
| Total $H_2SO_4$ | Total HCl | Total $HNO_3$ | Total Na | Total Fe | Al, Mn, Ti, Cr, V, Nb |
| Trace | 88.3 | 24.1 | Trace | 35.2 | Trace |

The organic solution in Table 8 as it stands ($O_A$) and the sample obtained by adding 0.15 vol. % of 2-ethylhexyl alcohol thereto ($O_B$) were respectively brought into contact with water for the inverse extraction test. The treating condition was $O_A/A=1.0/1.4$ and $O_B/A=1.15/1.4$ with the contact time of 5 minutes at 40° C. countercurrently in 4 stages. The result is as shown in Table 9.

TABLE 9

| | | (g/l) | |
|---|---|---|---|
| Starting Organic Solution | Solution After Treatment | $Fe^{3+}$ | Cl |
| No 2-ethylhexyl Alcohol | Organic | 10.4 | 26.0 |
| | Aqueous | 17.7 | 44.4 |
| With 2-ethylhexyl Alcohol | Organic | 0.6 | 1.5 |
| | Aqueous | 25.1 | 62.7 |

EXAMPLE 4

(Extraction)

A sulfuric acid solution containing $Fe_2(SO_4)_3$ and NaCl with the following composition was prepared artificially:

| | |
|---|---|
| $Fe^{3+}$ | 39.1 g/l |
| Cl | 108.4 g/l |
| $SO_4$ | 250 g/l |
| Na | 115 g/l |

The extraction of iron chloride complex into organic solvent was done with the use of 50% tributyl phosphate+50% isoparaffine. The extraction condition was as follows: the ratio of organic solvent to sulfuric acid solution (O/A ratio)=1.4/1, extraction time: 20 minutes, and temperature: room temperature. The analysis of the residual aqueous solution was as below:

| | |
|---|---|
| $Fe^{3+}$ | 2.1 g/l |
| Total $SO_4$ | 250 g/l |
| Total Cl | 14.8 g/l |
| Na | 115 g/l |

(Distillation of organic solvent)

The contents of Fe, Cl and $H_2O$ in the organic phase in the above extraction experiment was as below:

| | |
|---|---|
| Fe | 28.1 g/l |
| Cl | 70.5 g/l |
| $H_2O$ | 36.3 g/l |

200 ml of said organic phase was distilled at 28°–35° C. under a reduced pressure of 3 torrs until the volume of the bottom solution reaches to 48 ml. The analysis of the result was as follows:

| Bottom solution | |
|---|---|
| Volume | 48 ml |
| Fe | 117.1 g/l |
| Cl | 220.3 g/l |

| Distillate (−80° C.) | |
|---|---|
| Total volume | 152 ml |
| Volume of organic solvent | 116 ml |
| Volume of HCl solution | 36 ml |
| Concentration of HCl | 101 g/l |

(Back extraction)

Back extraction was done by bringing water into contact the organic phase remaining at the bottom part in the above distillation experiment under agitation. The extraction condition was as follows: O/A=1/3, time of agitation: 10 minutes and temperature: room temperature.

| | Organic phase | Aqueous phase |
|---|---|---|
| Fe | 1.4 g/l | 151.1 g/l |
| HCl | 2.7 g/l | 292.5 g/l |

Very excellent results could be obtained as compared with the case where no distillation of the organic phase was performed.

($FeCl_3$ manufacture)

The bottom solution in the above mentioned distillation experiment of the organic phase was subjected, instead of subjecting to back extraction, further to distillation up to a temperature in the range from 85° to 90° C. under a reduced pressure of 3 torrs, and anhydrous $FeCl_3$ with the analytical value as shown in the following could be obtained.

| | |
|---|---|
| Weight | 16.3 g |
| Fe | 34.3% |

| | |
|---|---|
| Cl | 65.0% |
| Organic solvent | 0.6% |
| Water | 0.0% |

What is claimed is:

1. A method for neutralization of sulfuric acid containing Fe ions, comprising adding ions selected from the group consisting of Na ions, K ions, Mg ions, Ca ions and $NH_4$ ions in the form of a compound containing chlorine to a sulfuric acid solution containing impurities comprising iron ions in an amount corresponding at least to the chemical equivalent to the $SO_4^{2-}$ therein, and bringing the resultant solution into contact with an organic solvent (b) containing oxygen, an alkylamine and combinations thereof, to extract the Fe ions from said aqueous solution into the organic solvent as a chloride complex.

2. A method according to claim 1 in which the sulfuric acid to be treated is obtained by adding sulfuric acid to a hydrochloric acid or nitric acid solution containing impurities comprising Fe ions and distilling or evaporating the resultant solution under reduced or atmospheric pressures to remove HCl and $HNO_3$.

3. A method according to claim 1 or 2 in which the compound containing chlorine to be added to the sulfuric acid solution comprises rock salt.

4. A method according to claim 1 or 2, in which an oxidizing agent is added to the sulfuric acid solution to be treated prior to the extraction of the iron ions there from into the orqanic solvent when the iron ions contained are in the state of $Fe^{2+}$ to oxidize said $Fe^{2+}$ ions to $Fe^{3+}$ ions electrochemically.

5. A method according to claim 1 or 2, in which another oxygen-containing organic solvent (d) is newly added to the organic solvent (b) containing the iron chloride complex, the resultant organic solution is brought into contact with water to inversely extract Fe ions and Cl ions into the water, and then the remaining organic solution is distilled or evaporated under reduced or atmospheric pressures to separate the oxygen-containing organic solvent (d) added prior to the inverse extraction and regenerate the organic solvent (b).

6. A method according to claim 1 or 2 in which the organic solvent containing the iron chloride complex is distilled or evaporated under reduced or atmospheric pressures for separating and recovering hydrochloric acid and water, and the remaining organic solution is brought into contact with water to inversely extract Fe ions and Cl ions into the water so as to recover iron chloride and regenerate the organic solvent.

7. A method according to claim 2, in which the residual solution of the organic solvent Fe extraction step is distilled or evaporated under a reduced pressure to recover HCl or $HNO_3$.

8. A method according to claim 1 or 2, in which when the molar ratio of Fe ions contained in the sulfuric acid solution to the total of the sum of $SO_4$ ions combined with Fe and the sum of $SO_4$ ions in the form of free sulfuric acid is less than 0.66, total, a solution or a solid containing iron is added to the sulfuric acid solution.

9. A method according to claim 4, in which the oxidizing agent added to the sulfuric acid solution is $HNO_3$.

10. A method according to claim 9, in which the organic solvent into which the iron chloride complex and $HNO_3$ have been extracted is brought into contact with an aqueous solution containing at least one compound selected from the group consisting of compounds of Na and Cl, compounds of Mg and Cl, compounds of K and Cl, compounds of $NH_4$ and Cl and compounds of Fe and Cl to selectively transfer $HNO_3$ into the aqueous solution.

* * * * *